UNITED STATES PATENT OFFICE.

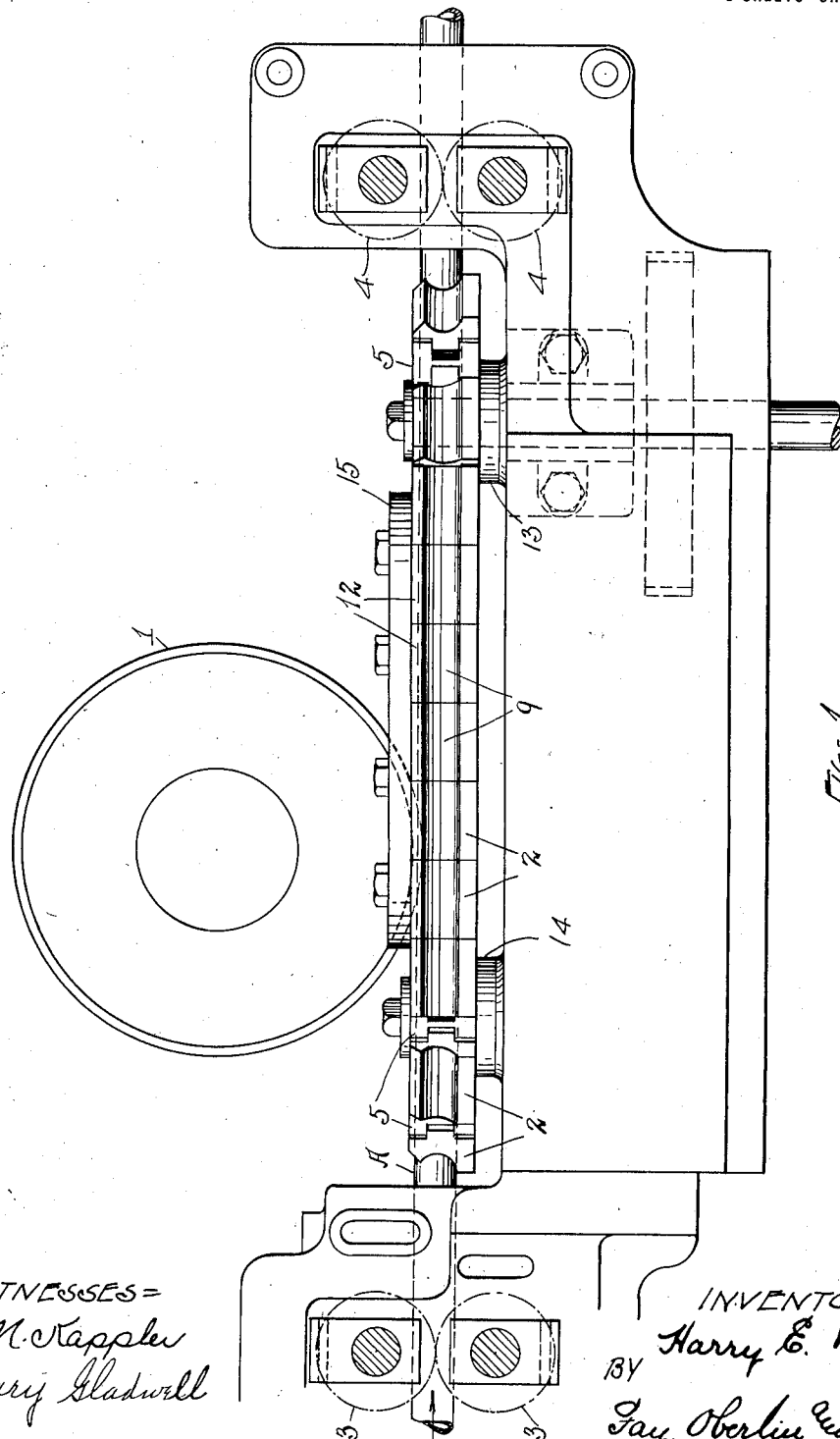

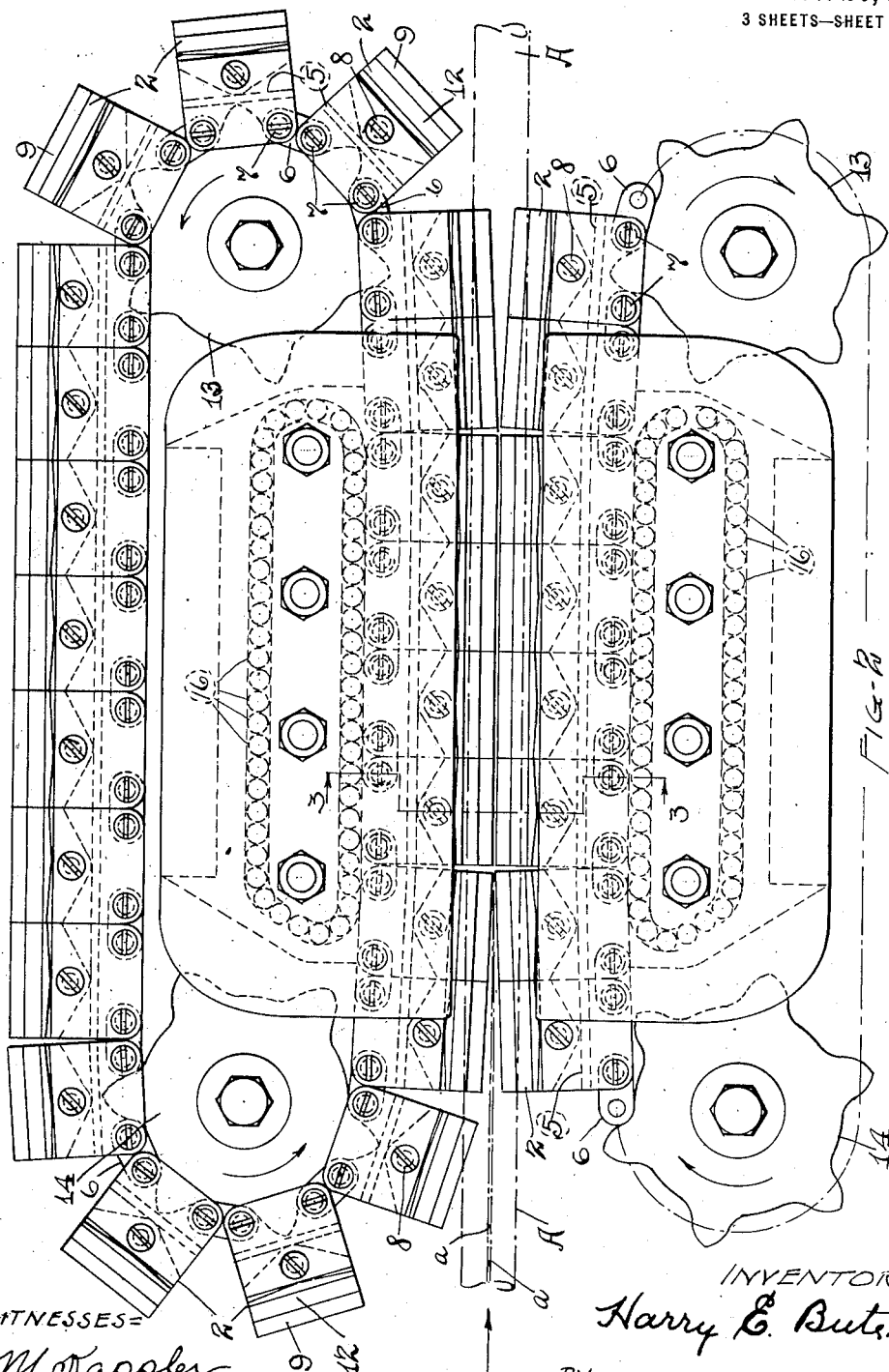

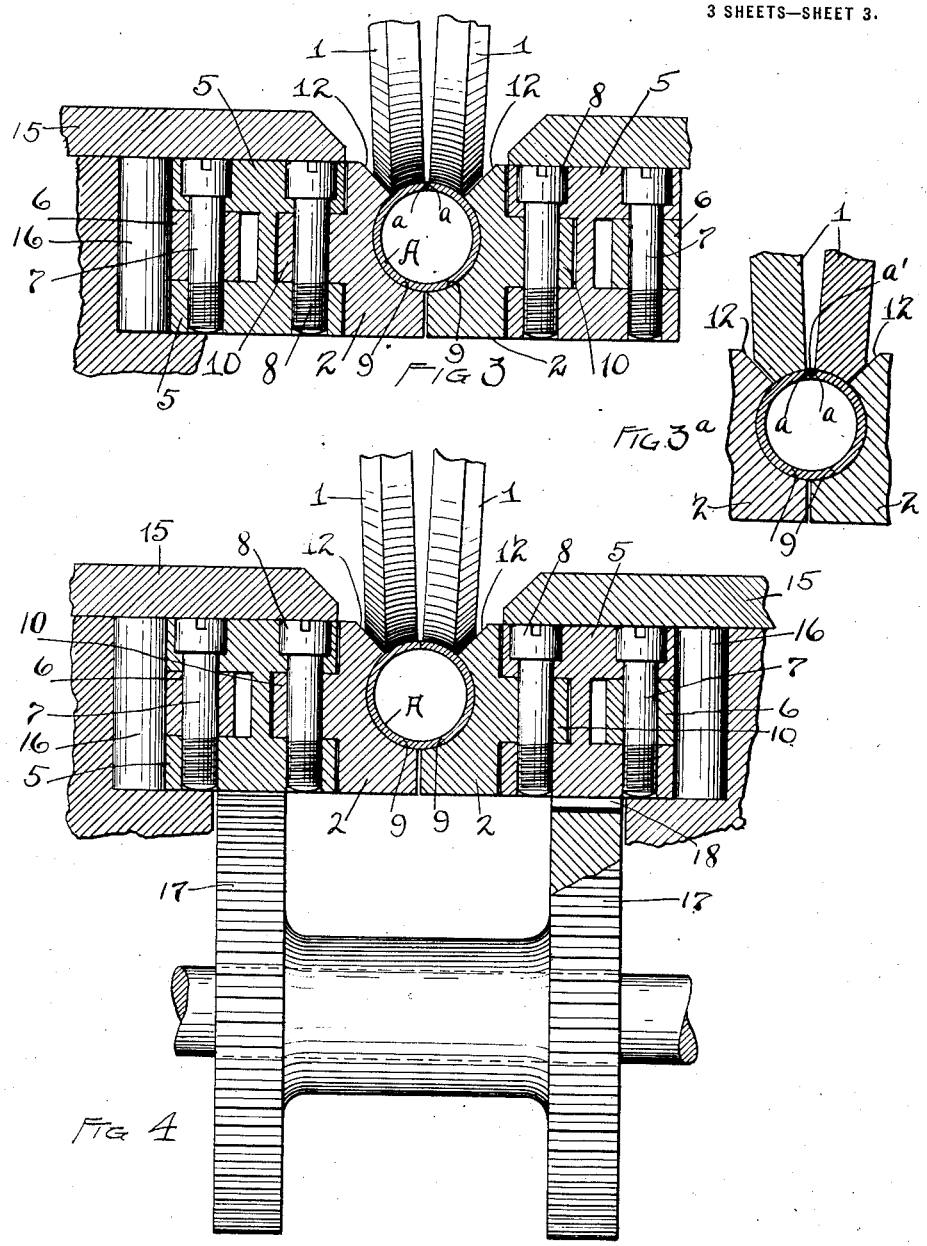

HARRY E. BUTCHER, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

APPARATUS FOR WELDING.

1,247,501.          Specification of Letters Patent.      Patented Nov. 20, 1917.

Application filed March 18, 1915. Serial No. 15,217.

*To all whom it may concern:*

Be it known that I, HARRY E. BUTCHER, a citizen of the United States, and a resident of Cleveland, county of Cuyahoga, and State of Ohio, have invented a new and useful Improvement in Apparatus for Welding, of which the following is a specification, the principle of the invention being herein explained and the best mode in which I have contemplated applying that principle, so as to distinguish it from other inventions.

The present improvements, relating as indicated to the art of welding, have more particular regard, however, to the manufacture of metal tubing, where the tube is preliminarily formed from the flat strip into a tubular shape with the edges which are to be joined in abutting relation. Afterward the edges of such preliminarily formed tube are either directly welded together so as to form a homogeneous mechanical juncture, or else they are brazed together by introducing between the same a strip or strand of braze material and then fusing together such edges and interposed braze. The object of the present invention is to provide an apparatus, whereby such welding, or brazing, as the case may be, can be effectively carried on with the use of an electric current as the heating agent.

It is, of course, not broadly new to utilize a heating electric current in a similar connection, and the present invention may be regarded as an improvement upon the electric tube welding machine which forms the subject matter of United States Letters Patent No. 658,741 to Otto Parpart. As compared with such earlier electric tube welding machine, the present invention provides means which are adapted simultaneously to feed the stock or preliminarily formed tube past the welding electrodes and at the same time retain such stock with its edges under the proper pressure to insure a satisfactory union. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1 is a side elevation, with parts broken away, of a welding apparatus, or machine, embodying my present improved features of construction; Fig. 2 is a plan view of the same, the welding means proper, comprising electrodes, as above indicated, being omitted in order not to confuse the drawing; Figs. 3 and 3ª are transverse sections of a portion of such apparatus, the plane of the section being indicated by the line 3—3, Fig. 2, the only difference in the two views lying in the form of the tube being welded; Fig. 4 is a similar cross-sectional view showing a modification in the driving mechanism for the apparatus; and Fig. 5 is a perspective view of a detail.

For use in my present improved apparatus, the strip metal is preliminarily formed into a tube blank A, with the edges $a$ in proper abutting relation. Where said edges are to be directly united to form a homogeneous mechanical juncture, the strip in being rolled or otherwise brought into a tubular shape, is so manipulated as to cause said edges to come into full surface contact with each other, as shown in Figs. 2 and 3. Where, on the contrary, it is desired simply to braze the edges together, it is preferable to bring them together in the preliminarily formed tube so as to leave a V-shaped groove into which a strip or strand $a'$ of braze may be pressed as shown in Fig. 3ª. It will, of course, be understood that the step of preliminarily forming the tube may be accomplished either separately, or simultaneously and in unison with the welding operation, as may be found most convenient. This forming step is not illustrated, since it is not directly involved as a part of the present invention.

Referring to the mechanism as illustrated in Figs. 1, 2 and 3, the tubing is fed past the welding electrodes 1 by means of two series of movable clamping blocks 2 which are simultaneously brought up on opposite sides of such tubes, pressed thereagainst, progressively advanced for a predetermined distance, and then withdrawn out of contact with the tube. Guide rolls 3, 3 and 4, 4, and a sharp-edged disk (not shown) may be used to assist in directing the tube before and after it passes the angle between the clamping blocks and to preserve the joint in proper position.

Each of the series of blocks 2 is carried by what is in effect an endless chain, the detailed construction of which will now be specifically noted. A series of supporting members, or blocks 5, of the general form illustrated in perspective in Fig. 5, having a cross-section of I-shape, are connected by means of short links 6 pivotally secured to the members by pins 7 passing through apertures near their respective rear corners. Pivotally attached to each such supporting member by a pin 8 passing through apertures near its front edge, and midway between its ends, is a clamping block 2, proper, the preferred form of which may be readily ascertained by reference to Figs. 1 and 2. In other words, these blocks are formed with longitudinal grooves 9 in their front faces, of the proper curvature to conform with the outside surface of the tube being welded. Each block is formed on its rear face with a tongue 10 that fits the recess in the front face of the corresponding supporting member 5, such tongue, and also the body of the block, being beveled, so as to permit of a certain amount of oscillation of the latter with respect to the supporting member. The upper edges of the blocks, furthermore, are cut back, as at 12, so as to leave exposed a portion of the tube on each side of the seam, that may be gripped between said blocks, and thus permit the welding electrodes to be brought into contact with such tube, as will be presently described.

Each series of blocks 2, with its series of linked supporting members 5, passes around a pair of suitably disposed sprocket wheels 13, 13 and 14, 14, the two pairs of sprocket wheels being disposed substantially parallel, as shown in Fig. 1, and at least one sprocket of each pair being arranged to be power-driven in the constructional form there illustrated. The two contiguously disposed runs of the two series of link-connected blocks 5 are supported vertically by the bed of the machine on which they slidably rest. They also pass under cover-plates 15 which, in conjunction with such machine bed, form a guide for such blocks, these plates being formed to leave exposed only the upper faces of the clamping-blocks 2, proper. Each such plate also serves to house a series of anti-friction members in the form of rollers 16 freely movable in a closed guide-way or path, lying within the corresponding chain of blocks, one portion of which path is disposed parallel with the travel of the tube, and immediately to the rear of the linked members 5, so that such members have rolling contact therewith. The distance between the two sets of roller bearings is such that as the clamping blocks are carried therebetween by the synchronous progressive movement of the linked supporting members, said blocks will be forced toward each other so as to bear with a predetermined pressure upon the tube being welded. The number of blocks which may thus be caused to simultaneously clamp such tube will vary, depending upon their size and the longitudinal extent of the apparatus. As shown in Fig. 2, four such blocks of each series are in clamping position, two blocks at the left, approaching such position, and two at the right, just leaving such position, it being assumed that the direction of movement of the stock through the apparatus is from left to right as indicated by the direction arrow.

In place of applying power directly to one or both of the paired sprockets 13 and 14 of each series of clamping blocks, a pair of driving gears 17, as shown in Fig. 4, may be utilized, such gears being disposed to engage with rack teeth 18, formed on the under faces of the supporting members 5, in that portion of their travel where they are carried along in contact with the rollers 16. In this portion of their path, said members 5 form a substantially continuous rack, and the necessary driving action can be secured by the means described.

The welding electrodes for conveying the electric current to the tube A preferably take the form of relatively large disks, as illustrated, the edges of such disks being of proper cross-section to conform with the shape of the tube being welded, as shown in Figs. 2 and 3. The manner in which these electrodes are supported, as well as the way in which current is supplied thereto, are of no interest in the present connection, it being understood that they are suitably connected with a source of electric current, such as the secondary of a transformer, whereby a current of the proper potential and volume may be brought to the work. These electrodes are arranged so as to contact with the tube, one on each side of the joint therein, at a point substantially adjacent to the first of the series of clamping blocks 2 which are in full clamping action. Accordingly, as fast as the edges $a$ of the tube along the line of the proposed junction are forced together by such clamping action, the heating electric current traverses the same from the one electrode to the other, and fuses such edges sufficiently to cause them to coalesce. The pressure of the clamping blocks continues until the tube has been carried some distance beyond the welding point, such distance being sufficient to permit the fused metal to cool and set, so that when the tube passes beyond, the junction is complete and permanent.

Where in place of directly welding the edges together, it is desired to braze them, the only difference in the foregoing described arrangement and procedure is to introduce between such edges, which are preferably formed so as to leave a V-shaped groove, a strip of braze $a'$, as shown in Fig. 3ª, such strip being automatically disposed in any suitable manner just in advance of the welding electrodes, having regard to the direction of movement of the stock. Accordingly the heating electric current that passes across from the one electrode to the other will pass through and fuse such braze, the temperature produced being gaged so as to also heat the edges themselves sufficiently to insure the formation of a satisfactory brazed joint. As before, the edges are held firmly in the same relation which they occupy when the fusion occurs, until the braze has had time to set so that as the tube passes beyond the apparatus, its edges will remain brazed together.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the character described, the combination with a device adapted to weld together the edges of a preliminarily formed tube; of means adapted to maintain such tube with its edges abutting under pressure and at the same time progressively feed such tube past said welding device, said means including two series of blocks having faces conforming to the cross-sectional shape of such tube, links connecting the blocks of each series so as to form a continuous chain thereof, means adapted to move said chains longitudinally of such tube, and anti-friction means apart from said chains adapted to forcibly press said blocks, while thus moving, against such tube.

2. In a machine of the character described, the combination with a device adapted to weld together the edges of a preliminarily formed tube; of means adapted to maintain such tube with its edges abutting under pressure and at the same time progressively feed such tube past said welding device, said means including two series of blocks having faces conforming to the cross-sectional shape of such tube, links connecting the blocks of each series so as to form a continuous chain thereof, means adapted to move said chains longitudinally of such tube, and anti-friction members apart from, but movable in unison with said chains respectively adapted to forcibly press said chains, while thus moving, against said tube.

3. In a machine of the character described, the combination with a device adapted to weld together the edges of a preliminarily formed tube; of means adapted to maintain such tube with its edges abutting under pressure and at the same time progressively feed such tube past said welding device, said means including two series of blocks having faces conforming to the cross-sectional shape of such tube, links connecting the blocks of each series so as to form a continuous chain thereof, means adapted to move said chains longitudinally of such tube, and anti-friction members apart from, but movable in closed paths lying within said chains respectively, such paths being in part parallel with the line of travel of the tube and said members being adapted to forcibly press said blocks while thus moving against such tube.

4. In a machine of the character described, the combination with a device adapted to weld together the edges of a preliminarily formed tube; of means adapted to maintain such tube with its edges abutting under pressure and at the same time progressively feed such tube past said welding device, said means including a series of interlinked supporting members movable longitudinally of such tube, a corresponding series of blocks oscillatorily attached to said members, respectively, and adapted to forcibly grip the tube, and guide means engaging the top and bottom faces of said supporting members.

5. In a machine of the character described, the combination with a device adapted to weld together the edges of a preliminarily formed tube; of means adapted to maintain such tube with its edges abutting under pressure and at the same time progressively feed such tube past said welding device, said means including two series of blocks having faces conforming to the cross-sectional shape of such tube, links connecting the blocks of each series so as to form a continuous chain thereof, means adapted to move said chains longitudinally of such tube, and anti-friction members apart from, but movable in closed paths lying within said chains respectively, guide means engaging the top and bottom faces of said supporting members, and anti-friction means adapted to engage the inner faces of said members to forcibly press the blocks carried thereby against such tube.

6. In a machine of the character described, the combination with a device adapted to weld together the edges of a preliminarily formed tube; of means adapted to maintain such tube with its edges abutting under pressure and at the same time progressively feed such tube past said welding device, said means including two series of blocks having faces conforming to the cross-sectional shape of such tube, links connecting the blocks of each series so as to form a continuous chain thereof, means adapted to move said chains longitudinally of such tube, anti-friction members apart from, but movable in closed paths lying within said chains respectively, guide means engaging the top and bottom faces of said supporting members, and anti-friction members apart from, but movable in unison with said series of interlinked supporting members adapted to engage the inner faces of said members to forcibly press the blocks carried thereby against such tube.

7. In a machine of the character described, the combination with a device adapted to weld together the edges of a preliminarily formed tube or like article; of means adapted to maintain such article with its edges abutting under pressure and at the same time progressively feed such tube past said welding device, said means including a series of supporting members recessed on their opposite faces, links disposed in the recesses on one side of said members and connecting the latter so as to form a chain thereof, a corresponding series of blocks having faces conforming to the cross-sectional form of such tube and tongues to fit and be pivotally held in the recesses on the other side of said members, means adapted to move said chain longitudinally of the tube, and means adapted to forcibly press said blocks, while thus moving, against such tube.

8. In a machine of the character described, the combination with a device adapted to weld together the edges of a preliminarily formed tube or like article; of means adapted to maintain such article with its edges abutting under pressure and at the same time progressively feed such tube past said welding device, said means including a series of supporting members recessed on their opposite faces, links disposed in the recesses on one side of said members and connecting the latter so as to form a chain thereof, a corresponding series of blocks having faces conforming to the cross-sectional form of such tube and tongues to fit and be pivotally held in the recesses on the other side of said members, means adapted to move said chain longitudinally of the tube, and anti-friction means engaging the first-named side of said members through a portion of their path of travel and adapted to forcibly press said block, while thus moving, against such tube.

9. In a machine of the character described, the combination with a device adapted to weld together the edges of a preliminarily formed tube or like article; of means adapted to maintain such article with its edges abutting under pressure and at the same time progressively feed such tube past said welding device, said means including two series of supporting members recessed on their opposite faces, links disposed in the recesses on one side of said members and connecting the latter so as to form two chains thereof, one lying on each side of such tube and movable longitudinally thereof, a corresponding series of blocks having faces conforming to the cross-sectional form of such tube and tongues to fit and be pivotally held in the recesses on the other side of said members, means adapted to move said chains longitudinally of the tube, and means adapted to forcibly press together the adjacent blocks of the respective chains, while thus moving, so as to grip such tube between them.

10. In a tube-welding machine, the combination with electrodes adapted to contact with a preliminarily formed tube adjacent the respective edges thereof; of means adapted to maintain such tube with its edges abutting under pressure and at the same time progressively feed such tube past said electrodes, said means including a series of supporting members recessed on their opposite faces, links disposed in the recesses on one side of said members and connecting the latter so as to form a chain thereof, a corresponding series of blocks having faces conforming to the cross-sectional form of such tube and tongues to fit and be pivotally held in the recesses on the other side of said members, means adapted to move said chain longitudinally of the tube, and means adapted to forcibly press said blocks, while thus moving, against such tube.

11. In a tube-welding machine, the combination with electrodes adapted to contact with a preliminarily formed tube adjacent the respective edges thereof; of means adapted to maintain such tube with its edges abutting under pressure and at the same time progressively feed such tube past said electrodes, said means including a series of supporting members recessed on their opposite faces, links disposed in the recesses on one side of said members and connecting the latter so as to form a chain thereof, a corresponding series of blocks having faces conforming to the cross-sectional form of such tube and tongues to fit and be pivotally held in the recesses on the other side of said members, means adapted to move said chain longitudinally of the tube, and anti-friction means engaging the first-named side of said members through a portion of their path of travel and adapted to forcibly press said block, while thus moving, against such tube.

12. In a tube-welding machine, the combination with rotatable disk-electrodes adapted to contact with a preliminarily formed tube adjacent the respective edges thereof; of means adapted to maintain such tube with its edges abutting under pressure and at the same time progressively feed the same past said electrodes, said means including two series of supporting members recessed on their opposite faces, links disposed in the recesses on one side of said members and connecting the latter so as to form two chains thereof, one lying on each side of such tube and movable longitudinally thereof, a corresponding series of blocks having faces conforming to the cross-sectional form of such tube and tongues to fit and be pivotally held in the recesses on the other side of said members, means adapted to move said chains longitudinally of the tube, and means adapted to forcibly press together the adjacent blocks of the respective chains, while thus moving, so as to grip such tube between them.

Signed by me, this 16th day of March, 1915.

HARRY E. BUTCHER.

Attested by—
H. M. KATHE,
JNO. F. OBERLIN.